Patented May 12, 1925.

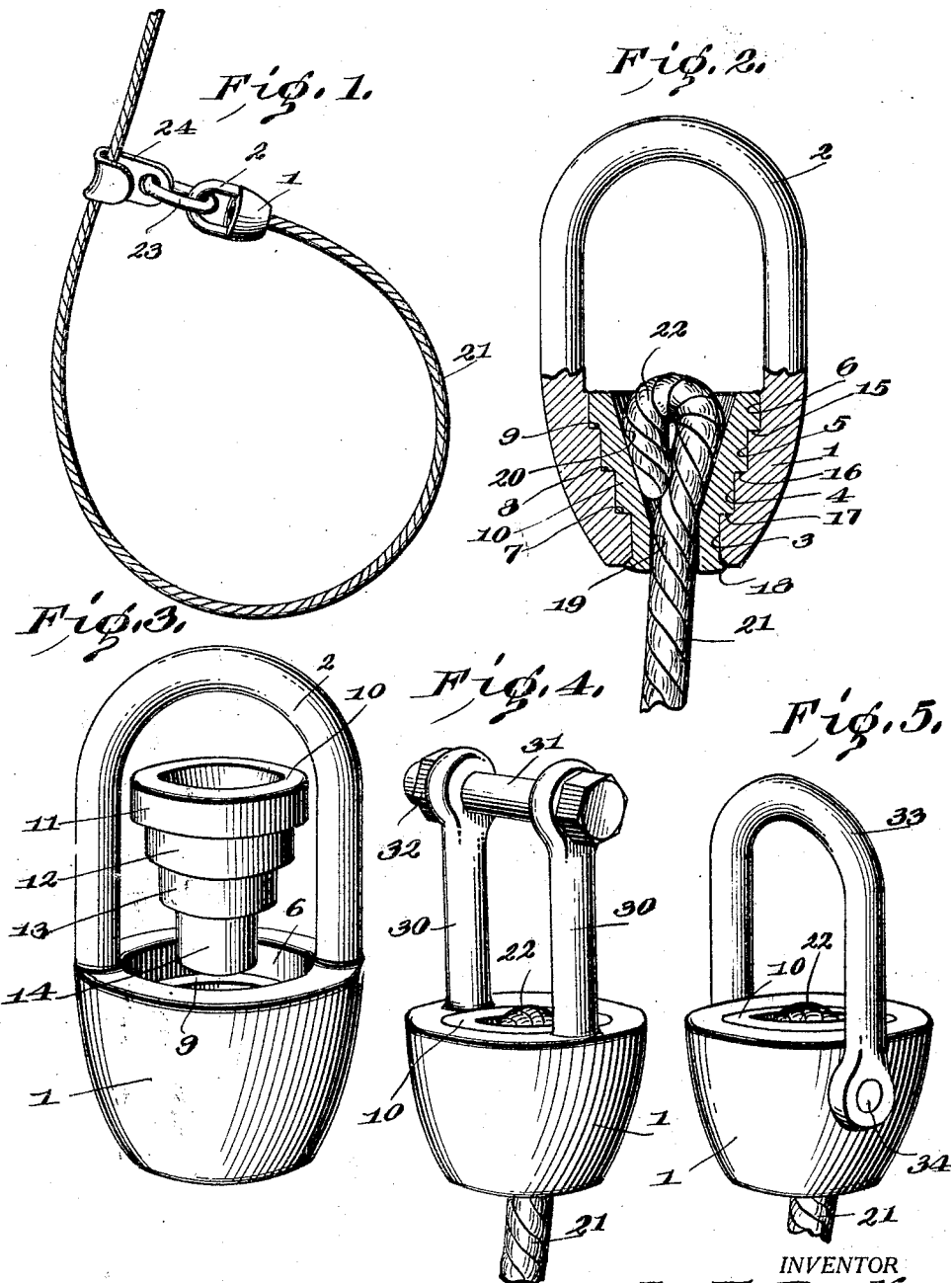

1,537,785

UNITED STATES PATENT OFFICE.

LUKE EVERETT PARKER, OF PE ELL, WASHINGTON.

SWIVEL CONNECTION.

Application filed July 18, 1923. Serial No. 652,398.

*To all whom it may concern:*

Be it known that I, LUKE EVERETT PARKER, a citizen of the United States, and resident of Pe Ell, in the county of Lewis and State of Washington, have invented certain new and useful Improvements in Swivel Connections, of which the following is a specification.

My invention relates to improvements in swivel connections, and it consists in the combinations, constructions and arrangements herein described and claimed.

An object of the invention is to provide a reliable and highly efficient swivel connection which is adapted for use to connect a cable, such as a choker line, to a choker hook or like fastening element so the hook or like fastening element may twist or rotate about the axis of the swivel connection without causing kinking of the choker line, the swivel connection being relatively light in weight, simple in construction and at the same time strong and durable.

Other objects and advantages will be apparent from the following description, considered in conjunction with the accompanying drawings, in which—

Figure 1 is a view showing a swivel connection embodying the invention connecting one end of a choker line to a chain link which is in turn attached to a choker hook, Figure 2 is a relatively enlarged view, partly in side elevation and partly in vertical section, showing the swivel connection and a portion of the choker line, Figure 3 is a perspective view showing the swivel connection with the parts thereof separated, Figure 4 is a perspective view showing a modified form of swivel connection attached to a choker line, and Figure 5 is a view similar to Figure 4, showing another modified form of swivel connection.

A swivel connection embodying the invention is designed for use primarily in logging operations to connect the choker line or cable with a fastening element although obviously the application of the swivel connection is not limited to use in logging operations for the purpose stated but may be used to connect various flexible elements to a fastening element, as will presently appear. It is desirable in logging operations requiring the use of a choker line that the hook shall be attached to the line through the agency of a swivel connection but prior to my invention all such swivel connections which were sufficiently strong to successfully withstand the stresses to which they ordinarily are subjected in the service for which provided were sufficiently heavy in weight to interfere with the use of the choker line in the usual manner. A swivel connection embodying the invention is constructed in such manner as to withstand the stresses in the service for which it is provided without adding materially to the weight of the elements connected thereby.

As best seen in Figures 2 and 3, a swivel connection embodying the invention comprises a body member 1 and a shackle portion 2. The body portion 1 is shown as being substantially cup-shaped, being of greater outside diameter at one end than at the other end thereof and the shackle portion 2 is shown as being integral with the body portion, the arms thereof being merged at their extremities into the body portion at diametrically opposite points on the larger end of the latter.

The body portion 1 is provided with an axial bore which comprises successive portions 3, 4, 5 and 6 respectively which are circular in cross sectional contour and are stepped in diameter, the diameter of the portion which is located at the smaller end of the body portion being least. Each of the portions 3, 4 and 5 of the bore is merged into the adjacent and next larger portion of the bore by an annular shoulder, the respective shoulders being designated 7, 8 and 9.

The embodiment of the invention illustrated in Figures 2 and 3 also includes an inner or socket member 10. The inner or socket member 10 has a length approximately equal to that of the body portion 1 of the outer member and is fashioned in such manner that the outer wall thereof consists of a series of portions circular in cross sectional contour and stepped in diameter, the respective portions being indicated at 11, 12, 13 and 14. The portion 11 is of greatest diameter and is merged into the portion 12 by an annular shoulder 15. The portion 12 is merged into the portion 13 by an annular shoulder 16 and the portion 13 is merged into the portion 14, which is of smallest diameter by an annular shoulder 17. The diameters and lengths of the portions 11, 12 and 13 and the diameter of the portion 14 of the outer wall of the inner member 10 are such that the inner member 10 is adapted to be rotatably supported within the body portion 1 of the outer member, the respective shoulders 15, 16 and 17 resting upon the shoulders 9, 8 and 7 of the body portion 1 and the portions 11, 12, 13 and 14 respectively engaging with the portions 6, 5, 4 and 3 in such manner as to prevent any appreciable lateral movement of the inner member 10 relatively to the body portion 1 of the outer member without preventing free rotation of the inner member 10 in the body portion of the outer member. The portion of the inner member 10 having the outer wall 14 is preferably of slightly greater length than the portion of the outer member having the inner wall 3 so that the portion 14 of the inner member extends at its outer end slightly beyond the corresponding end of the body portion of the outer member and this extending portion may be upset as indicated at 18 to preclude axial movement of the inner member 10 relatively to the outer member. The inner or socket member 10 is provided with a bore 19 having a tapered portion 20 increasing in diameter toward the larger end of the inner member. A flexible element such as the cable 21 may have an end thereof inserted in the bore 19 into and through the tapered portion 20 of the bore, the inserted end of the cable being doubled back upon itself within the tapered portion 20 of the bore of the inner member 10, as indicated at 22, the doubled portion of the cable being secured to the inner member 10 in any suitable known manner, as by means of Babbitt or like metal which may be poured in molten condition into the bore of the inner member 10 about the doubled portion of the cable and then permitted to cool.

From the foregoing description of the various parts of the device, the operation thereof may be readily understood. The cable 21 may be a choker line and the shackle 2 may be attached to a link 23, whereby it is attached to a choker hook 24.

With the arrangement described, it will be manifest that the inner or socket member and the inner wall of the body portion of the outer member will have contact with each other over a relatively great area in a swivel connection of a given size. Each of the annular shoulders on the outer wall of the inner member 10 will rest upon the corresponding shoulder on the inner wall of the body portion of the outer member and in consequence, the swivel connection is adapted to sustain a relatively great stress caused by a pull on the cable 21 or the shackle 2 without any axial movement of the inner member 10 relatively to the outer member of the swivel connection and without displacement of the relatively movable parts of the swivel connection.

In Figure 4, I show a modified form of swivel connection in which a pair of parallel arms 30 integral with the body portion 1 of the outer member are upstanding from the larger end of the body portion 1 of the outer member and are connected at their outer ends by a cross member 31. The cross member 31 may be a bolt extending through aligned openings or eyes in the outer ends of the upstanding members 30 and having the extending end of the shank thereof provided with a nut 32 for holding the bolt against displacement. The parts 30, 31, 32 of the form of the device shown in Figure 4 replace the shackle portion 2 of the form of the device shown in Figures 1 to 3 inclusive. The construction of the form of the device shown in Figure 4 is otherwise identical with that of the form of the device illustrated in Figures 1 to 3 inclusive and the same reference characters therefore have been used to designate like parts of the two forms of the device.

In the form of the device illustrated in Figure 5, the shackle portion 2 is replaced by a clevis 33 and the body portion 1 of the outer member is provided with a pair of outwardly extending diametrically opposite journal pins or trunnions, such as that indicated at 34, which are received in openings in the extreme end portions of the arms of the clevis.

Obviously, my invention is susceptible of embodiment in forms other than those illustrated in the accompanying drawings. For example, the body portion 1 of the outer member may be fashioned to provide a greater or less number of the circular portions of the inner wall thereof than I have illustrated in the accompanying drawings without departing from the spirit and scope of the invention. I therefore consider as my own all such modifications of the forms of the device which I have disclosed in the foregoing as fairly fall within the scope of the appended claims.

I claim:—

1. A swivel connection comprising an outer member having a body portion provided with a bore having the wall thereof stepped in diameter at a plurality of points and at regular intervals from one end thereof to the opposite end, and an inner member snugly interfitting the bore of the body portion of outer member and being rotatable in the latter, said inner member being adapted for the reception of an end portion of a flexible cable, said inner member terminating at its respective ends flush with the corresponding ends of the outer member.

2. A swivel connection comprising an outer member having a substantially cup-shaped body portion having a bore formed with the wall thereof consisting of a series of portions circular in cross-sectional contour and stepped in diameter, said portions being of substantially the same length and each two adjacent circular portions of the bore being merged one into the other by an annular shoulder, and a socket member rotatably received in the body portion of the outer member and having the outer wall thereof fashioned to provide portions circular in cross sectional contour and closely interfitting the corresponding portions of the body portion of the outer member, each two adjacent circular portions of the outer wall of the socket member being merged into each other by an annular shoulder adapted to rest on the corresponding shoulder of the inner wall of the body portion of the outer member, said socket member having a bore including a tapered portion increasing in area toward the end of the socket member which has the largest outer diameter, and a substantially U-shaped attaching member secured at its ends to said socket member and extending beyond the larger end of the latter.

LUKE EVERETT PARKER.